United States Patent
Doh

(10) Patent No.: US 11,269,964 B2
(45) Date of Patent: Mar. 8, 2022

(54) FIELD-OF-INTEREST BASED PREFERENCE SEARCH GUIDANCE SYSTEM

(71) Applicant: MYCELEBS CO., LTD., Seoul (KR)

(72) Inventor: Jun Woong Doh, Seoul (KR)

(73) Assignee: MYCELEBS CO., LTD., Seoul (KR)

( * ) Notice: Subject to any disclaimer, the term of this patent is extended or adjusted under 35 U.S.C. 154(b) by 0 days.

(21) Appl. No.: 16/072,471

(22) PCT Filed: Jul. 24, 2017

(86) PCT No.: PCT/KR2017/007964
§ 371 (c)(1),
(2) Date: Jul. 24, 2018

(87) PCT Pub. No.: WO2019/022262
PCT Pub. Date: Jan. 31, 2019

(65) Prior Publication Data
US 2020/0159794 A1    May 21, 2020

(51) Int. Cl.
*G06F 16/30* (2019.01)
*G06F 16/9535* (2019.01)
*G06F 16/45* (2019.01)
*G06F 16/435* (2019.01)

(52) U.S. Cl.
CPC ........ *G06F 16/9535* (2019.01); *G06F 16/437* (2019.01); *G06F 16/45* (2019.01)

(58) Field of Classification Search
CPC .... G06F 16/9535; G06F 16/45; G06F 16/437; G06F 16/334
See application file for complete search history.

(56) References Cited

U.S. PATENT DOCUMENTS

| 2014/0040274 A1* | 2/2014 | Aravamudan | G06F 16/3328 707/741 |
| 2015/0142780 A1* | 5/2015 | Oh | G06F 16/338 707/722 |

FOREIGN PATENT DOCUMENTS

| JP | 2000155758 A | 6/2000 |
| JP | 2002222208 A | 8/2002 |
| JP | 2003150528 A | 5/2003 |
| JP | 2009140306 A | 6/2009 |
| KR | 1020040063641 A | 7/2004 |
| KR | 1020070112344 A | 11/2007 |

(Continued)

*Primary Examiner* — Tyler J Torgrimson
(74) *Attorney, Agent, or Firm* — Duane Morris LLP

(57) ABSTRACT

Disclosed herein is a field-of-interest based preference search guidance system. The field-of-interest based preference search guidance system includes: a search requester terminal configured to select a desired search field of interest from among provided fields of interest, and to transmit designated attribute information; and a search service provision server configured to provide the fields of interest to the search requester terminal, to provide a fixed attribute list part and a variable attribute list part descriptive of field-of-interest based keywords belonging to a selected search field of interest to the search requester terminal, to select field-of-interest based keywords belonging to a fixed attribute designated value from information included in transmitted designated attribute information when the designated attribute information is transmitted from the search requester terminal, and to transmit the selected field-based search requester preference incorporating search keywords to the search requester terminal.

7 Claims, 10 Drawing Sheets

(56) References Cited

FOREIGN PATENT DOCUMENTS

| | | |
|---|---|---|
| KR | 20090078701 A | 7/2009 |
| KR | 1020100068532 A | 6/2010 |
| KR | 10-1099154 B1 | 12/2011 |
| KR | 10-1417894 B1 | 7/2014 |
| KR | 1020150059208 A | 6/2015 |
| KR | 20150105753 A | 9/2015 |
| KR | 20170089364 A | 8/2017 |
| WO | 2013047471 A1 | 4/2013 |

\* cited by examiner

FIELD-OF-INTEREST BASED PREFERENCE SEARCH GUIDANCE SYSTEM

TECHNICAL FIELD

The present invention relates to a field-of-interest based preference search guidance system which can incorporate the personal preference of a search requester thereinto based on a variable attribute database into which an ever-changing public opinion is automatically incorporated in a search field, to which a search term desired by the requester belongs, without requiring that the search requester directly designates a search keyword, thereby providing a search result keyword suitable for the preference of the corresponding search requester.

BACKGROUND ART

Today, with the development of the Internet, various types of information can be viewed, and an individual can directly search for desired information via a search system and then view the information.

When a search requester makes a search request by entering a search term corresponding to a search target, a general search system outputs news, moving images, images, etc. containing content related to the search term entered via the search request so that the search requester can view them.

However, this search method cannot provide various types of information desired by the search requester because a search is performed only based on the keyword entered by the search requester.

As an alternative to the above method, there has been proposed a system in which a search requester directly defines a relationship with a keyword and information is searched for using the relationship defined by the corresponding search requester. However, additional information can be obtained from the search target only when the search requester must personally became aware of a search term for the desired search target and must associate the search term with an additional search term, i.e., a supplementary search term related to the search term. Therefore, there arises a need for a field-of-interest based preference search guidance system which can incorporate the personal preference of a search requester thereinto based on a variable attribute database into which an ever-changing public opinion is automatically incorporated in a search field, to which a search term desired by the requester belongs, without requiring that the search requester directly designates a search keyword, thereby providing a search result keyword suitable for the preference of the corresponding search requester.

DISCLOSURE

Technical Problem

The present invention has been conceived to overcome the above-described problems of the prior art, and an object of the present disclosure is to provide a field-of-interest based preference search guidance system which can incorporate the personal preference of a search requester thereinto based on a variable attribute database into which an ever-changing public opinion is automatically incorporated in a search field, to which a search term desired by the requester belongs, without requiring that the search requester directly designates a search keyword, thereby providing a search result keyword suitable for the preference of the corresponding search requester.

Technical Solution

According to an aspect of the present disclosure, there is provided a field-of-interest based preference search guidance system including: a search requester terminal configured to select a desired search field of interest from among provided fields of interest, and to transmit designated attribute information, including the designated values of fixed attributes and the designated values of variable attributes designated by a search requester in a fixed attribute list part and a variable attribute list part descriptive of field-of-interest based keywords, so that a field-based search requester preference incorporating search keyword suitable for a preference of the search requester can be selected from among field-of-interest based keywords belonging to the selected search field of interest; and a search service provision server configured to provide the fields of interest to the search requester terminal, to provide the fixed attribute list part and the variable attribute list part descriptive of the field-of-interest based keywords belonging to the selected search field of interest to the search requester terminal when the search field of interest is selected from among the provided fields of interest by the search requester terminal, to select field-of-interest based keywords belonging to a fixed attribute designated value from information included in transmitted designated attribute information when the designated attribute information is transmitted from the search requester terminal, to sum the points of variable attribute designated values, included in the designated attribute information, among the variable attribute values of the selected field-of-interest based keywords, and to transmit the selected field-based search requester preference incorporating search keywords to the search requester terminal with them indicated according to priority.

The fixed attribute list part may be a list including the values of the fixed attributes, which are information corresponding to invariable values in information descriptive of the field-of-interest based keywords belonging to the search field of interest so that the search requester can become aware of them; the variable attribute list part may be a list including the variable attributes, which are phrases descriptive of the field-of-interest based keywords in occurred events when the events of the corresponding field-of-interest based keywords have occurred in mass media including TV, newspapers and magazines, real-time searches, search portal sites including blogs and Internet cafes, and social network services (hereinafter referred to as "SNSs"), in information descriptive of the field-of-interest based keywords belonging to the field of interest so that the search requester can become aware of them; and a point, indicative of the frequency at which information has been posted to the mass media including TV, newspapers and magazines, the real-time searches, the search portal sites including blogs and Internet cafes, and the SNSs where the events have occurred, may be recorded in conjunction with each of the variable attributes.

The search service provision server may include a database (DB) unit, and a keyword management engine; the DB unit may include: a form information DB configured such that there are stored various types of screens necessary to provide a search keyword incorporating his or her personal preference to the search requester without requiring that the search requester directly designates a search keyword; a field-of-interest based keyword fixed attribute list DB configured such that information classified and stored for each field of interest, which is the values of fixed attributes, which are information corresponding to invariable values among field-of-interest based keywords belonging to the corresponding field of interest and information descriptive of the field-of-interest based keywords, is classified, stored, and managed in a list form; a field-of-interest based keyword variable attribute list DB configured such that information associated with the field-of-interest based keyword fixed attribute list DB, which is a list including variable attributes corresponding to phrases, descriptive of the corresponding field-of-interest based keywords in occurred events when the events have occurred in mass media including TV, newspapers and magazines, real-time searches, search portal sites including blogs and Internet cafes, and SNSs, in information descriptive of the field-of-interest based keywords belonging to the corresponding field of interest so that the search requester can become aware of them, is stored and managed, and a point, indicative of the frequency at which information has been posted to the mass media including TV, newspapers and magazines, the real-time searches, the search portal sites including blogs and Internet cafes, and the SNSs where the events have occurred, is recorded in conjunction with each of the variable attributes; and a customer information DB configured such that an ID and password of the search requester are stored; and the keyword management engine may search mass media including TV, newspapers and magazines, real-time searches, search portal sites including blogs and Internet cafes, and SNSs, may classify a posted event as a variable attribute corresponding to a phrase descriptive of a corresponding field-of-interest based keyword and then store the variable attribute in the field-of-interest based keyword variable attribute list DB when the event belonging to the field-of-interest based keyword has been posted, may calculate the frequency at which the event classified as the corresponding variable attribute has been posted to mass media including TV, newspapers and magazines, real-time searches, search portal sites including blogs and Internet cafes, and SNSs, and may classify, store, and manage a point corresponding to the calculated value as a set for the corresponding variable attribute.

The keyword management engine may search the mass media including TV, newspapers and magazines, the real-time searches, the search portal sites including blogs and Internet cafes, and the SNSs on a daily basis, and may, when an event corresponding to information to which one of the field-of-interest based keywords belongs has been posted, calculate a time weight in addition to a point corresponding to a value obtained by calculating a frequency of the posted information, and then incorporate the time weight into the point.

The keyword management engine may perform control so that when the value of a variable attribute corresponding to a phrase descriptive of the corresponding field-of-interest based keyword in the posted event is a new value which has not been stored in the field-of-interest based keyword variable attribute list DB, the new value of the variable attribute can be additionally stored in the field-of-interest based keyword variable attribute list DB.

The form information DB may include a designated search field-of-interest attribute selection screen, including the fixed attribute list part configured such that values of fixed attributes, which are information corresponding to invariable values in information descriptive of the field-of-interest based keywords belonging to the search field of interest so that the search requester can become aware of them, are displayed to be selectable, and the variable attribute list part configured such that variable attributes, which are phrases descriptive of the field-of-interest based keywords in occurred events when the events of the corresponding field-of-interest based keywords have occurred in mass media including TV, newspapers and magazines, real-time searches, search portal sites including blogs and Internet cafes, and SNSs, in information descriptive of the field-of-interest based keywords belonging to the field of interest so that the search requester can became aware of them, are displayed to be selectable.

The designated search field-of-interest attribute selection screen may include a designated variable attribute weight part configured to selectively increase and decrease a weight level of a variable attribute designated by the search requester in the variable attributes displayed on the variable attribute list part; the search requester terminal may include designated variable attribute weight information, generated by a manipulation of the designated variable attribute weight part, in the designated attribute information, and transmits the resulting designated attribute information; and the search service provision server may calculate the point of the corresponding variable attribute by incorporating the designated variable attribute weight information into the point of a variable attribute designated value, included in the designated attribute information transmitted from the search requester terminal, through the operation of the keyword management engine.

Advantageous Effect

According to the present disclosure, the personal preference of a search requester can be incorporated into the system based on the variable attribute database into which an ever-changing public opinion is automatically incorporated in a search field, to which a search term desired by the requester belongs, without requiring that the search requester directly designates a search keyword. Accordingly, an advantage arises in that there can be provided a search result keyword suitable for the preference of the corresponding search requester.

MODE FOR INVENTION

Figure 1:
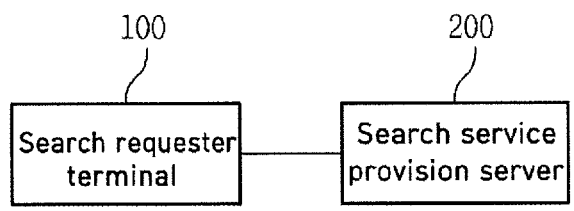
FIG. 1 is a view showing the overall configuration of a field-of-interest based preference search guidance system according to the present disclosure.
Figure 2:
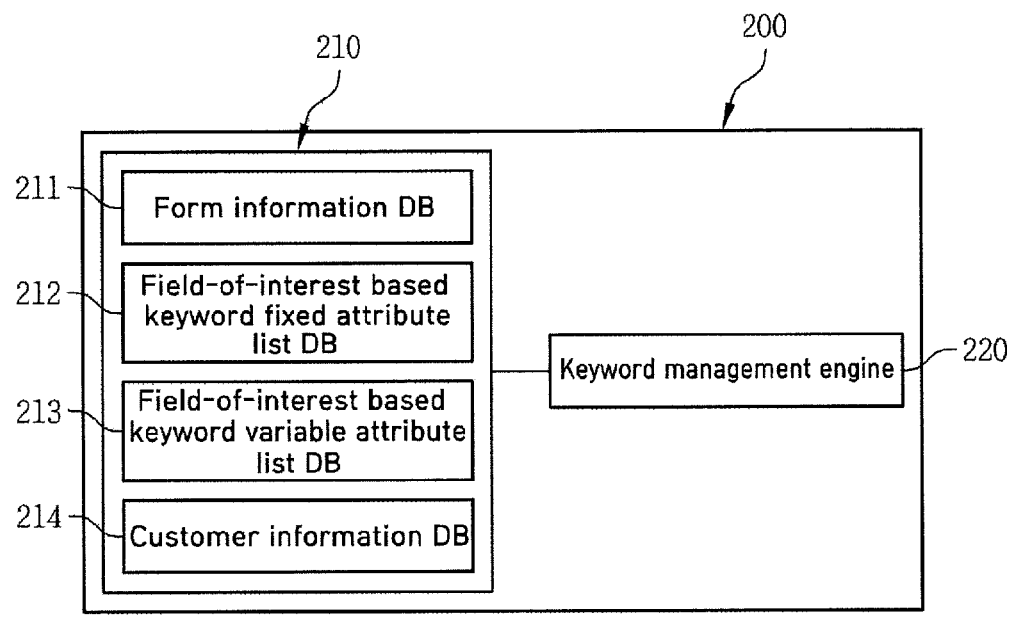
FIG. 2 is a view showing the detailed configuration of a search service provision server constituting a part of the field-of-interest based preference search guidance system according to the present disclosure.
Figure 3:
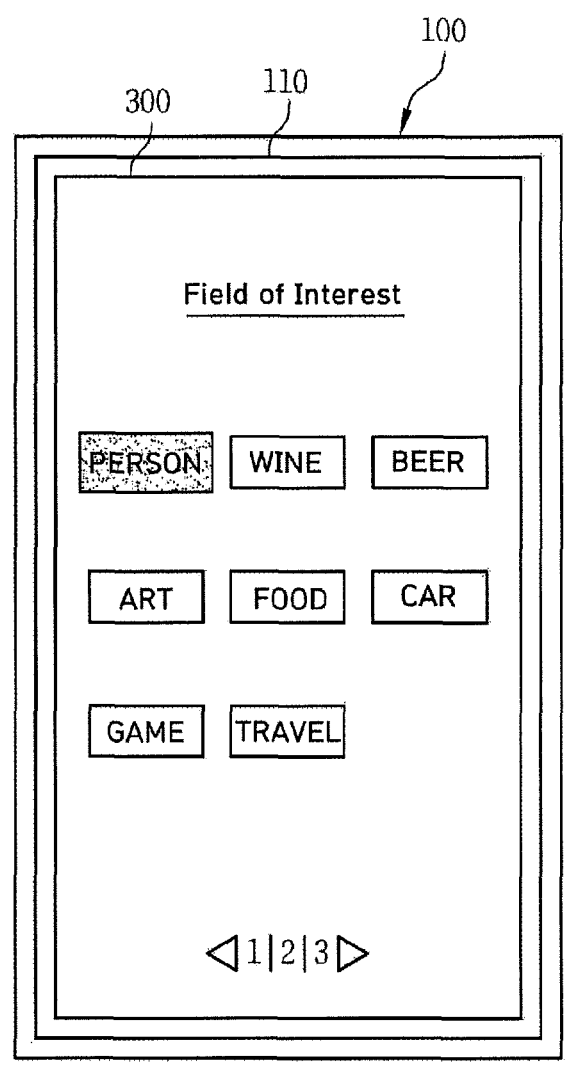
FIG. 3 is a view showing a search field-of-interest selection screen which is provided in the field-of-interest based preference search guidance system according to the present disclosure.

The configurations and operations of exemplary embodiments of the present disclosure will be described in detail below with reference to the accompanying drawings.

A field-of-interest based preference search guidance system according to the present disclosure basically includes a search requester terminal 100 and a search service provision server 200.

According to an exemplary embodiment of the present disclosure, a field-of-interest based preference search guidance system may include a search service provision server 200 and a search requester terminal 100. The search service provision server 200 and the search requester terminal 100 are connected to each other, and communicate over a network. The search service provision server 200 may be implemented as, e.g., a common computer, a server, or another device capable of electronic processing or similar processing corresponding to electronic processing. The search requester terminal 100 may be implemented as, e.g., a personal computer, a tablet PC, a notebook computer, a laptop computer, a smartphone, a handheld device, or another device accessible to a general user/consumer and capable of electronic processing or similar processing corresponding to electronic processing.

The search service provision server 200 provides interface page information, adapted to generate an interface page required for a clothing search, to the search requester terminal 100. The search requester terminal 100 provides an interface page to a user by using the received interface page information. The interface page information may be transferred, e.g., in an html document form or in another form in which similar or equivalent information can be transferred. According to another exemplary embodiment, the page layout/format information of the interface page information adapted to generate an interface page may be previously stored in the search requester terminal 100, and only content to be entered into the page may be transferred from the search service provision server 200 to the search requester terminal 100. In this case, the search requester terminal 100 may construct a page layout/format according to the previously stored page layout/format information, and may fill a page with content by using the page information received from the search service provision server 200.

The search requester terminal 100 may run a web browser or separate application, and may perform an operation based on the present disclosure via the web browser or application. In the following, for the sake of convenience, references to the web browser/application will be omitted, and the search requester terminal 100 or the configuration of the search requester terminal 100 will be simply described as performing operations.

The search requester terminal 100 transfers information about user input, received via the interface page, to the search service provision server 200. The search service provision server 200 transfers page information, adapted to generate page information and/or a search result page adapted to generate another interface page corresponding to the user input by using the information about user input, to the search requester terminal 100. The search requester terminal 100 provides an interface page and/or result page to the user by using the received page information.

In the following, for the sake of convenience, the page information (information adapted to generate a page) transferred to the search requester terminal 100 by the search service provision server 200 may be simply referred to as "information" or the like.

A fixed attribute and a variable attribute will be described.

A fixed attribute of a specific object refers to an attribute which does not vary according to the evaluation/response of a (potential) consumer group or another related group for the corresponding object. For example, the gender, height, or vocation of a person, the corresponding broadcasting company of a broadcast program, or the like corresponds to the fixed attribute. A variable attribute of a specific object refers to an attribute which is variable according to the evaluation/response of a (potential) consumer group or another related group for the corresponding object. The search service provision server 200 or a separately constructed server may collect a word/phrase (evaluation/response information) related to the corresponding object from, e.g., social networking services (SNSs), the web, mass media, etc. For example, when many SNS documents, newspaper articles, blog posts, or the like containing a combination of "program A" and "funny" (or related words) are generated and collected, "funny" may be recognized as a variable attribute of "program A." However, when after the passage of time, many documents containing the combination of "program A" and "funny" have not been recently generated but many documents containing a combination of "program A" and "impressive" have been recently generated and collected, "funny" may not be recognized as a variable attribute of the "program A" any longer, but "impressive" may be recognized as a variable attribute of "program A." However, the above-described method for selecting a variable attribute is merely an example, and the variable attribute may be selected by means of another method.

First, the search requester terminal 100 is a terminal member which selects a desired search field of interest from among provided fields of interest and which transmits designated attribute information, including the designated values of fixed attributes 411a, 411b, 411c, 411d, 411e and 411f, or 611a, 611b, 611c and 611d and the designated values of variable attributes 421 or 621 designated by a search requester in a fixed attribute list part 410 or 610 and a variable attribute list part 420 or 620 descriptive of field-of-interest based keywords, to the search service provision server 200 so that a field-based search requester preference incorporating search keyword suitable for the preference of the search requester can be selected from among field-of-interest based keywords belonging to the selected search field of interest. For example, the designated values of fixed attributes 411c are below 10, teen ages, twenties, thirties, forties, above 49.

In this case, the fixed attribute list part 410 or 610 is a list including the values of the fixed attributes 411a, 411b, 411c, 411d, 411e and 411f, or 611a, 611b, 611c and 611d, i.e., information corresponding to invariable values in information descriptive of the field-of-interest based keywords belonging to the search field of interest so that the search requester can become aware of them. The variable attribute list part 420 or 620 is a list including the variable attributes 421 or 621, i.e., phrases descriptive of the field-of-interest based keywords in occurred events when the events of the corresponding field-of-interest based keywords have occurred in mass media including TV, newspapers and magazines, real-time searches, search portal sites including blogs and Internet cafes, and SNSs, in information descriptive of the field-of-interest based keywords belonging to the field of interest so that the search requester can become aware of them. The fixed attribute list part 410 or 610 and the variable attribute list part 420 or 620 are provided by the search service provision server 200, are output via a display part 110, and are provided such that the search requester can beccne aware of them.

The search requester terminal 100 configured to perform the above-described function may be one of various devices capable of inputting and outputting information and processing information, such as a personal computer (PC), a notebook computer, a mobile phone, a tablet PC, a car navigation system, a smartphone, a smart watch, a smart TV, a personal digital assistant (PDA), a portable multimedia player (PMP), a digital broadcast receiver such as a digital video broadcasting (DVB) receiver, or the like.

Furthermore, the search requester terminal 100 transmits and receives information to and from the search service provision server 200, to be described later, over a network. The network may be: a wired network, such as a local area network (LAN), a wide area network (WAN), a value added network (VAN), or the like; a wireless network, such as a wireless LAN (WLAN), a Wi-Fi network, a wireless broadband (Wibro) network, a world interoperability for microwave access (Wimax) network, a high speed downlink packet access (HSDPA) network, a 3GPP long term evolution (LTE) network, a wireless broadband (WiBro) evolution network, a short-range wireless communication network (e.g., a Bluetooth network, a ZigBee network, or a radio frequency identification (RFID) network), an infrared data association (IrDA) network, an ultra wideband (UWB) network, a mobile communication network, or the like; or a mixed network thereof.

The search service provision server 200 is a server member which provides fields of interest to the search requester terminal 100, which provides the fixed attribute list part 410 or 610 and the variable attribute list part 420 or 620 descriptive of field-of-interest based keywords belonging to a selected search field of interest to the search requester terminal 100 when the search field of interest is selected from among the provided fields of interest by the search requester terminal 100, which selects field-of-interest based keywords belonging to a fixed attribute designated value from information included in transmitted designated attribute information when the designated attribute information is transmitted from the search requester terminal 100, which sums the points of variable attribute designated values, included in the designated attribute information, among the variable attribute values of the selected field-of-interest based keywords, and which transmits the selected field-based search requester preference incorporating search keywords to the search requester terminal 100 with them indicated according to priority.

In order to perform the above functions, the search service provision server 200 includes a database (DB) unit 210 and a keyword management engine 220.

First, the DB unit 210 includes a form information DB 211, a field-of-interest based keyword fixed attribute list DB 212, a field-of-interest based keyword variable attribute list DB 213, and a customer information DB 214.

The customer information DB 214 is a database member in which there are stored and managed not only the ID and the password of the search requester used by the search requester as login information when accessing the search service provision server 200 in order to use the service of the present disclosure but also contact information including the SNS account information, e-mail address, and telephone number of the search requester.

The field-of-interest based keyword fixed attribute list DB 212 is a database member in which information classified and stored for each field of interest, i.e., the values of the fixed attributes 411$a$, 411$b$, 411$c$, 411$d$, 411$e$ and 411$f$, or 611$a$, 611$b$, 611$c$ and 611$d$, which are information corresponding to invariable values among the field-of-interest based keywords belonging to the corresponding field of interest and information descriptive of the field-of-interest based keywords, is classified, stored, and managed in a list form.

Examples of the fixed attributes 411$a$, 411$b$, 411$c$, 411$d$, 411$e$ and 411$f$, or 611$a$, 611$b$, 611$c$ and 611$d$ are the gender, vocation, age group, blood type, Chinese Zodiac Sign, and Astrology Zodiac Sign of a person when the field of interest is a person, and are the type, manufacturing country, alcoholic proof, and price range of beer when the field of interest is beer.

The field-of-interest based keyword variable attribute list DB 213 is a database member in which information associated with the field-of-interest based keyword fixed attribute list DB 212, i.e., a list including variable attributes corresponding to phrases, descriptive of the corresponding field-of-interest based keywords in occurred events when the events have occurred in mass media including TV, newspapers and magazines, real-time searches, search portal sites including blogs and Internet cafes, in information descriptive of the field-of-interest based keywords belonging to the corresponding field of interest so that the search requester can become aware of them, is stored and managed, and a point, indicative of the frequency at which information has been posted to the mass media including TV, newspapers and magazines, the real-time searches, the search portal sites including blogs and Internet cafes, and the SNSs where the events have occurred, is recorded in conjunction with each of the variable attributes.

Through the above-described configuration, the keyword management engine 220 searches mass media including TV, newspapers and magazines, real-time searches, search portal sites including blogs and Internet cafes, and SNSs, classifies a posted event as a variable attribute corresponding to a phrase descriptive of a corresponding field-of-interest based keyword and then stores the variable attribute in the field-of-interest based keyword variable attribute list DB 213 when the event belonging to the field-of-interest based keyword has been posted, calculates the frequency at which the event classified as the corresponding variable attribute has been posted to mass media including TV, newspapers and magazines, real-time searches, search portal sites including blogs and Internet cafes, and SNSs, and classifies, stores, and manages a point corresponding to the calculated value as a set for the corresponding variable attribute.

In this case, in the keyword management engine 220, the search of the mass media including TV, newspapers and magazines, the real-time searches, the search portal sites including blogs and Internet cafes, and the SNSs is performed through the determination of whether there is relevance in such a way as to perform matching against the field-of-interest based keywords stored and managed in the field-of-interest based keyword fixed attribute list DB 212 when an event has occurred in mass media including TV, newspapers and magazines, real-time searches, search portal sites including blogs and Internet cafes, and SNSs at preset periods, e.g., on a daily basis.

When an event corresponding to information to which one of the field-of-interest based keywords belongs has been posted during the search of mass media including TV, newspapers and magazines, real-time searches, search portal sites including blogs and Internet cafes, and SNSs on a daily basis, the keyword management engine 220 calculates a time weight in addition to a point corresponding to a value obtained by calculating the frequency of the posted information, and incorporates the time weight into the point.

In other words, the time weight is incorporated into the point by taking into account the characteristic in which the degrees of preference and liking of netizens decreases as time elapses after a posting date based on the posting date of the event. The time weight is calculated by the equation 1/(the number of elapsed dates since the posting date of information), and is incorporated into a point by multiplying it by the corresponding point.

Furthermore, the keyword management engine 220 performs control so that when the value of the variable attribute 421 and 621 corresponding to a phrase descriptive of the corresponding field-of-interest based keyword in the posted event is a new value which has not been stored in the field-of-interest based keyword variable attribute list DB 213, the new value of the variable attribute 421 or 621 can be additionally stored in the field-of-interest based keyword variable attribute list DB 213. Accordingly, the degrees of preference and liking of netizens related to the corresponding search keyword are incorporated, and the newest information is also incorporated into a field-based search requester preference incorporating search keyword of a field of interest desired by the search requester through the former corporation, thereby providing the field-based search requester preference incorporating search keyword suitable for the preference of the search requester.

The form information DB 211 is a database member in which there are stored various types of screens necessary to provide a search keyword incorporating his or her personal preference to a search requester without requiring that the search requester directly designates a search keyword.

The form information DB 211 includes a search field-of-interest selection screen 300, a designated search field-of-interest attribute selection screen 400 or 600, and a field-based search requester preference incorporating search keyword guidance screen 500 or 700.

First, the search field-of-interest selection screen 300 is a graphic user interface (GUI) on which a plurality of fields of interest are displayed to be selectable such that a search requester can select a search field of interest to which a keyword suitable for his or her preference belongs.

The fields of interest which are displayed on the search field-of-interest selection screen 300 includes Person, Wine, Beer, Art, Food, Car, Game, and Travel, and may be continuously added and provided by a server administrator.

The designated search field-of-interest attribute selection screen 400 or 600 is a GUI which includes: a fixed attribute list part 410 or 510 on which fixed attributes 411a, 411b, 411c, 411d, 411e and 411f, or 611a, 611b, 611c and 611d, i.e., information corresponding to invariable values in information descriptive of field-of-interest based keywords belonging to a search field of interest selected by a search requester so that the search requester can become aware of them are displayed to be selectable; and a variable attribute list part 420 or 620 on which variable attributes, i.e., phrases descriptive of corresponding field-of-interest based keywords in occurred events when the events have occurred in mass media including TV, newspapers and magazines, real-time searches, search portal sites including blogs and Internet cafes, and SNSs in the information descriptive of the field-of-interest based keywords belonging to the search field of interest selected by the search requester so that the search requester can become aware of them are displayed to be selectable.

Furthermore, the designated search field-of-interest attribute selection screen 400 or 600 includes a designated variable attribute weight part 430 configured to selectively increase and decrease the weight level of a variable attribute 421 or 621 designated by a search requester in the variable attributes 421 and 621 displayed on the variable attribute list part 420 or 620.

Via the above configuration, the search requester terminal 100 includes designated variable attribute weight information, generated by the manipulation of the designated variable attribute weight part 430, in the designated attribute information and transmits the resulting designated attribute information. Furthermore, the search service provision server 200 calculates the point of the corresponding variable attribute by incorporating the designated variable attribute weight information into the point of a variable attribute designated value, included in the designated attribute information transmitted from the search requester terminal 100, through the operation of the keyword management engine 220.

The field-based search requester preference incorporating search keyword guidance screen 500 or 700 is a GUI in which the keyword management engine 220 calculates a final point by incorporating designated variable attribute weight information into the point of a variable attribute designated value, included in designated attribute information, among the variable attribute values of field-of-interest based keywords recognized via fixed attribute designated values in information included in designated attribute information transmitted from the search requester terminal 100 and in which the rankings of field-based search requester preference incorporating search keywords are displayed by reference to the final point obtained through the above calculation.

In this case, the number of field-based search requester preference incorporating search keywords which are displayed on the field-based search requester preference incorporating search keyword guidance screen 500 or 700 is previously set and provided by an administrator.

Additionally, after transmitting the field-based search requester preference incorporating search keyword to the search requester terminal 100, the search service provision server 200 classifies the designated attribute information transmitted from the search requester terminal 100 as user behavior information for the search field of interest of the corresponding search requester, cumulatively stores the user behavior information in the customer information DB 214, and operates the keyword management engine 220 so that an algorithm can be improved via machine learning using the user behavior information cumulatively stored in the customer information DB 214.

Figure 4A:
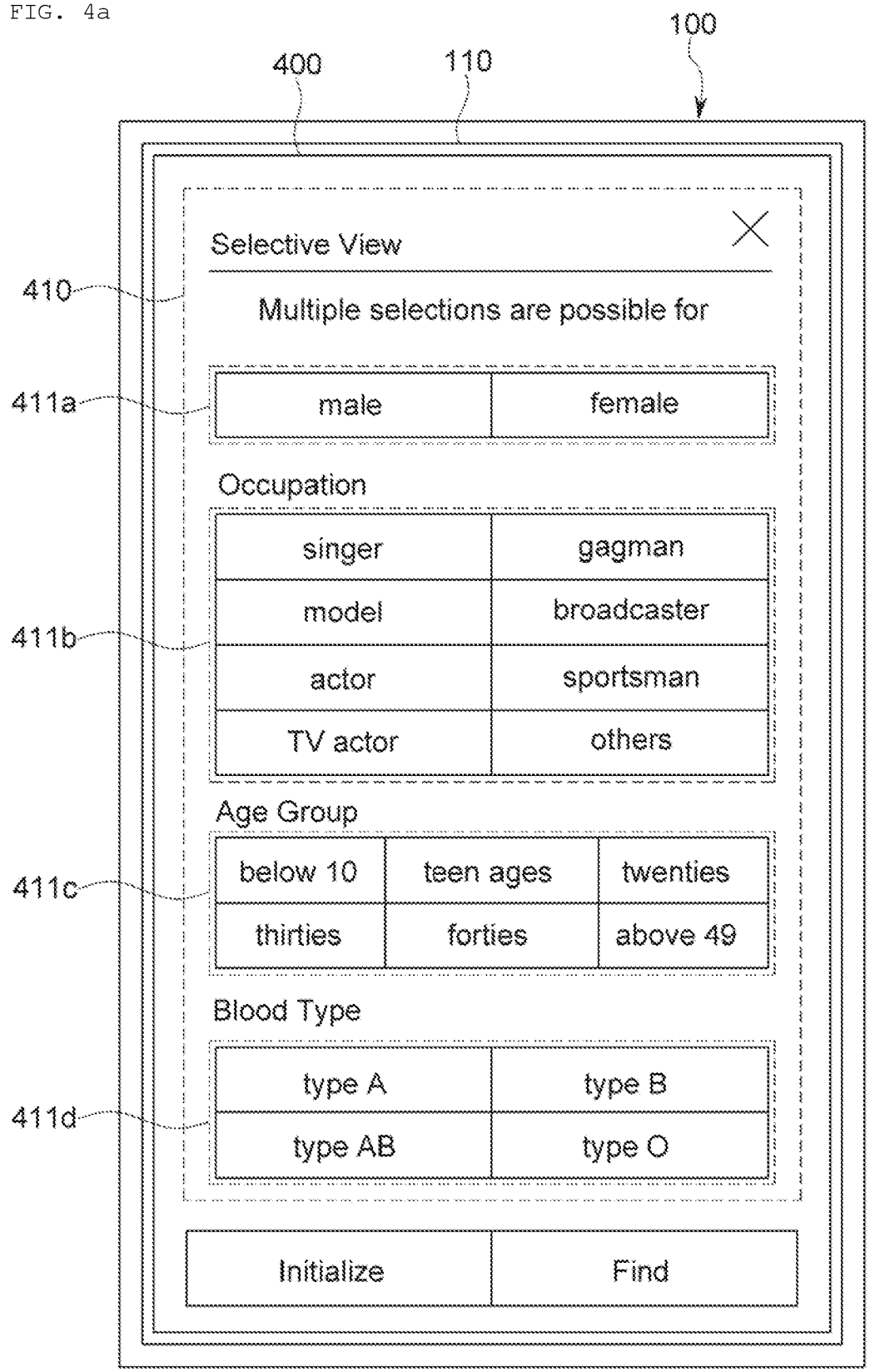
FIG. 4 is a view showing a designated search field-of-interest attribute selection screen which is provided in the field-of-interest based preference search guidance system according to the present disclosure.
Figure 4B:
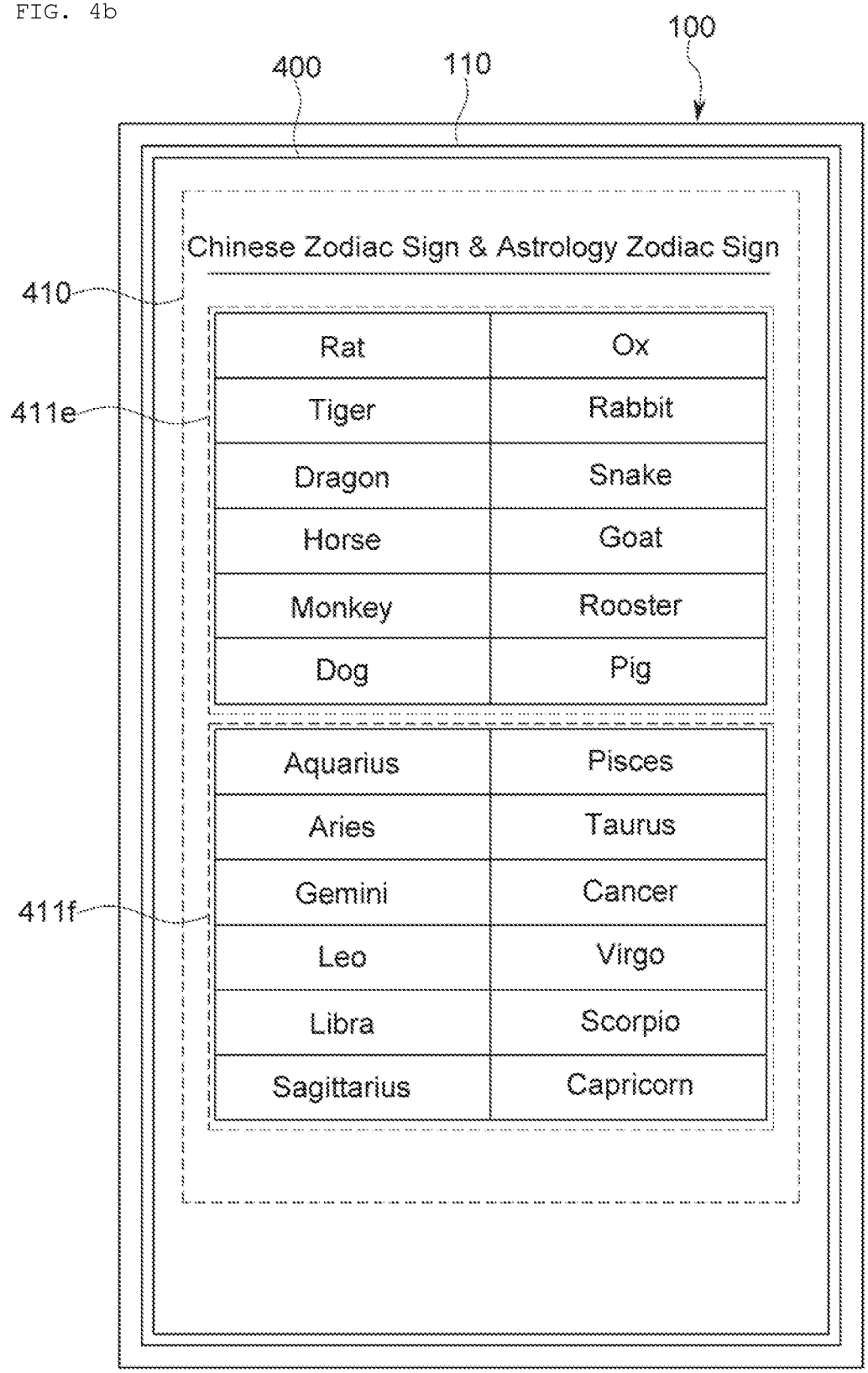
Figure 4C:
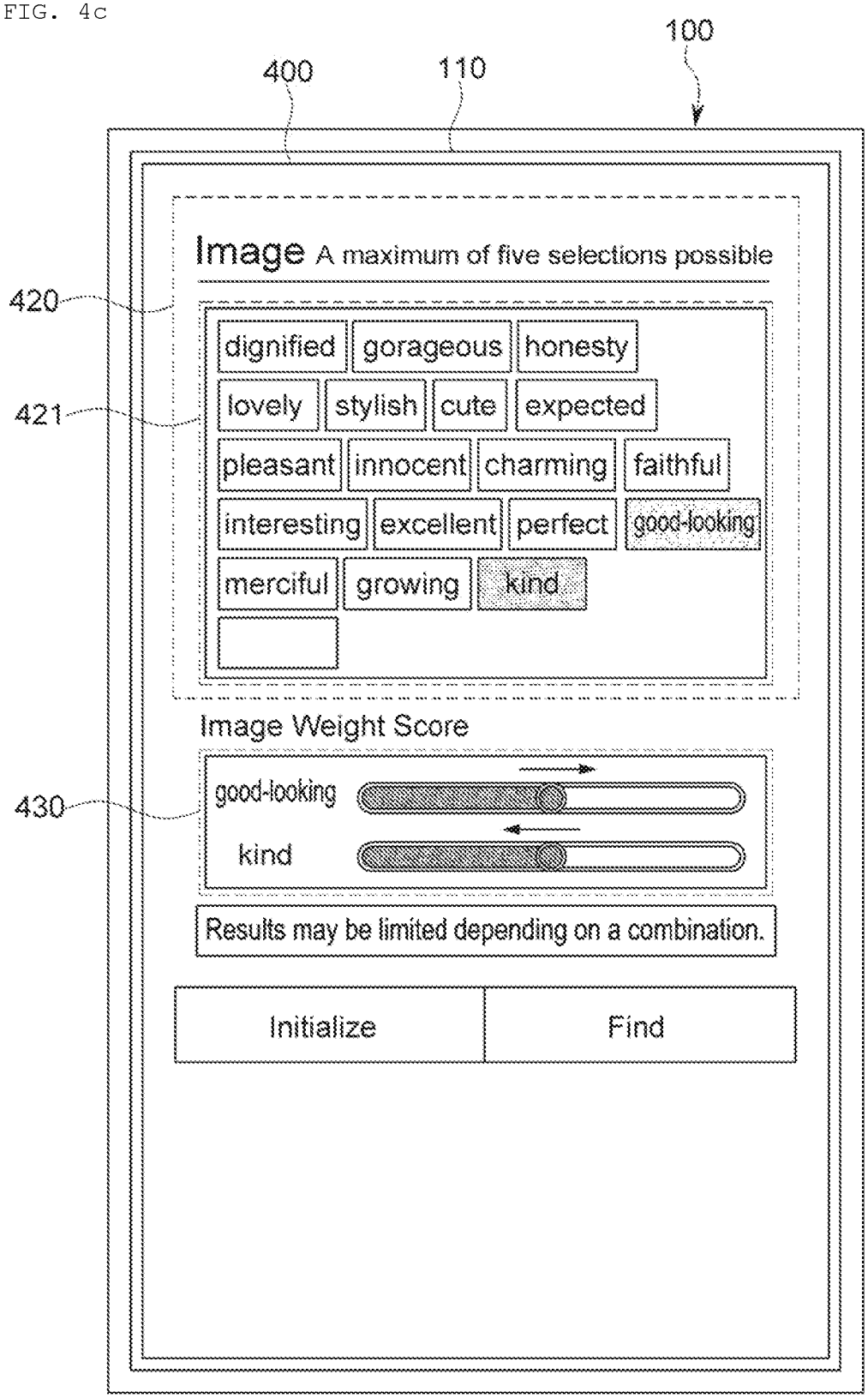
Figure 5:
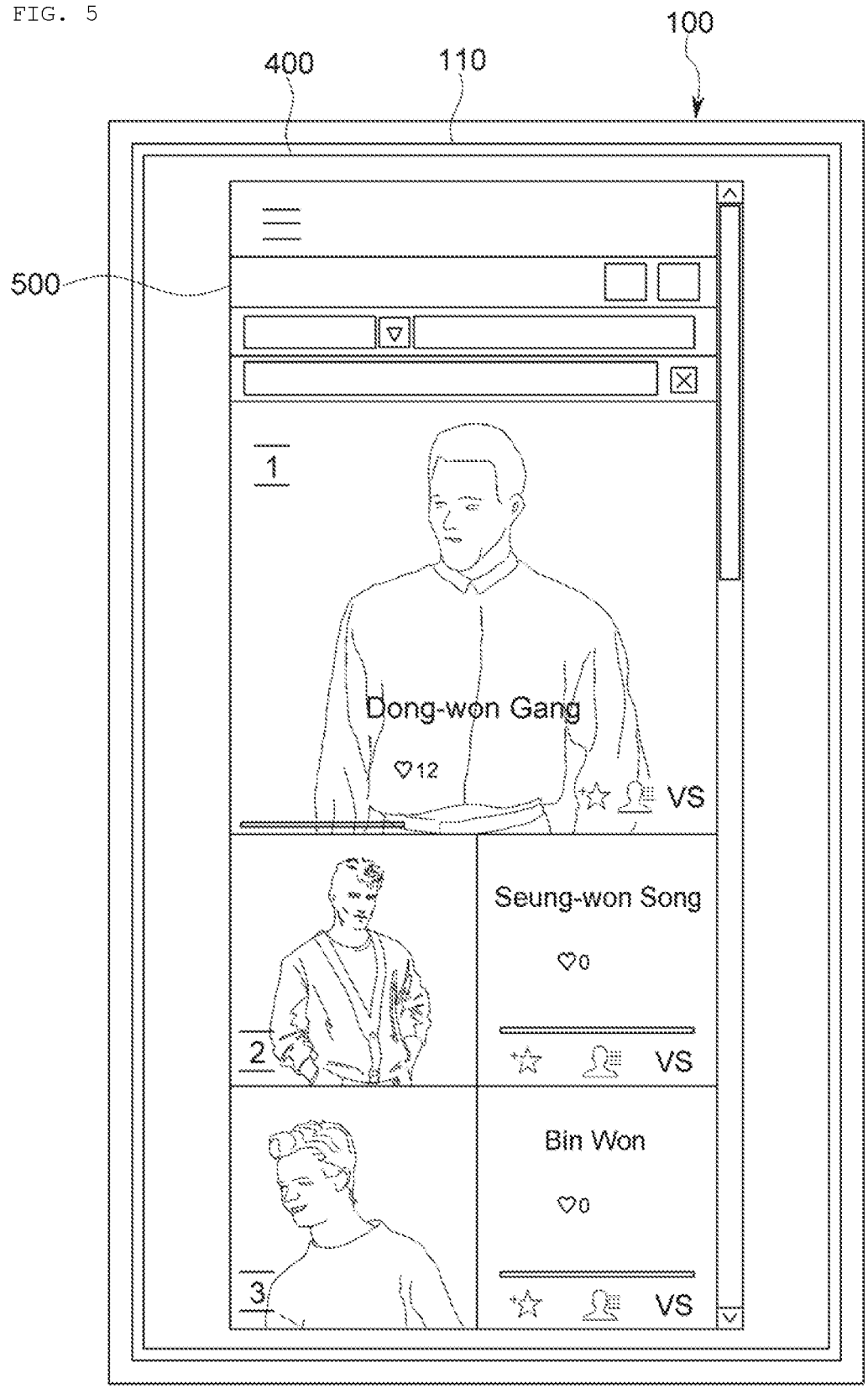
FIG. 5 is a view showing a field-based search requester preference incorporating search keyword guidance screen which is provided in the field-of-interest based preference search guidance system according to the present disclosure.

An exemplary embodiment using the field-of-interest based preference search guidance system configured as described above will be described with a focus on FIG. 4, as follows:

A search requester accesses the search service provision server 200 via the search requester terminal 100, and requests a field-of-interest based preference search service.

The search service provision server 200 extracts the search field-of-interest selection screen 300 from the form information DB 211 in response to a request from the search requester terminal 100, and transmits the search field-of-interest selection screen 300 to the search requester terminal 100.

Once the search requester terminal 100 has output the transmitted search field-of-interest selection screen 300 via the display part 110, the search requester selects a search field of interest (e.g. persons) from the output search field-of-interest selection screen 300.

The search requester terminal 100 transmits search field-of-interest selection information, including the selected "Person," to the search service provision server 200.

The search service provision server 200 recognizes the Person as being selected by reference to the transmitted search field-of-interest selection information, extracts the designated search field-of-interest attribute selection screen 400 from the form information DB 211, and transmits the designated search field-of-interest attribute selection screen 400 to the search requester terminal 100.

Once the search requester terminal 100 has output the transmitted designated search field-of-interest attribute selection screen 400 via the display part 110, the search requester designates the values of desired fixed attributes 411a, 411b, 411c, 411d, 411e and 411f among the fixed attribute 411a, 411b, 411c, 411d, 411e and 411f displayed on the fixed attribute list part 410, and designates the values of the variable attributes 421 displayed on the variable attribute list part 420, by reference to the output designated search field-of-interest attribute selection screen 400.

In this case, in the search requester terminal 100, once the search requester has selected a desired value from among the variable attributes 421 displayed on the variable attribute list part 420, the value of the selected variable attribute 421 is displayed on the designated variable attribute weight part 430.

The search requester sets the weight of the designated variable attribute displayed on the designated variable attribute weight part 430 when desired.

Thereafter, the search requester terminal 100 includes designated variable attribute weight information in designated attribute information including the designated values of the designated fixed attributes 411a, 411b, 411c, 411d, 411e and 411f, or 611a, 611b, 611c and 611d and the designated values of the variable attributes 421 and 621, and transmits the resulting designated attribute information to the search service provision server 200.

The search service provision server 200 extracts a matched field-of-interest based keyword from the stored field-of-interest based keywords of the corresponding designated field of interest by matching the designated values of the fixed attributes 411a, 411b, 411c, 411d, 411e and 411f against the field-of-interest based keyword fixed attribute list DB 212 by reference to the transmitted designated attribute information in which the designated variable attribute weight information has been included.

Thereafter, the search service provision server 200 extracts the field-of-interest based keywords of the designated field of interest including the designated values of the variable attributes 421 by matching the designated values of the variable attributes 421 against the field-of-interest based keyword variable attribute list DB 213 by reference to the designated attribute information in which the designated variable attribute weight information has been included.

Thereafter, in a state in which only field-of-interest based keywords, which are the same as field-of-interest based keywords matching the designated values of the fixed attributes 411a, 411b, 411c, 411d, 411e and 411f among the field-of-interest based keywords matching the designated values of the variable attributes 421, have been left, the search service provision server 200 calculates the final points of corresponding variable attributes by incorporating designated variable attribute weight information into points included in the variable attributes 421 of the left field-of-interest based keywords, and processes the left field-of-interest based keywords into field-based search requester preference incorporating search keywords with rankings indicated therefor by reference to the final points.

Thereafter, the search service provision server 200 extracts the field-based search requester preference incorporating search keyword guidance screen 500 from the form information DB 211, and transmits the extracted field-based search requester preference incorporating search keyword guidance screen 500, into which the processed field-based search requester preference incorporating search keywords have been inserted, to the search requester terminal 100.

The search requester terminal 100 outputs and provides the transmitted field-based search requester preference incorporating search keyword guidance screen 500 via the display part 110 so that the search requester can view it.

Figure 6A:
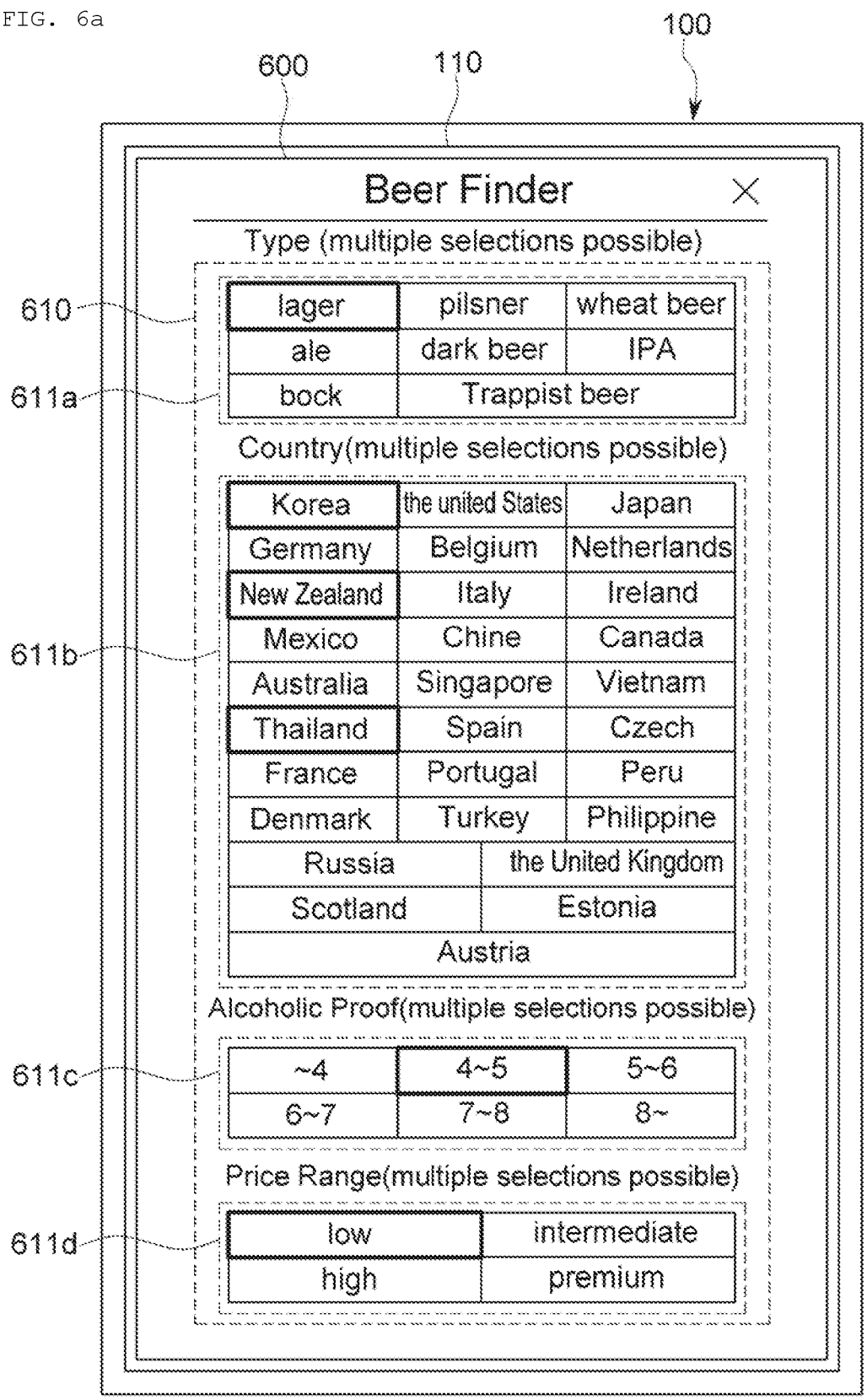
FIG. 6 is a view showing another exemplary embodiment of a designated search field-of-interest attribute selection screen which is provided in the field-of-interest based preference search guidance system according to the present disclosure.
Figure 6B:
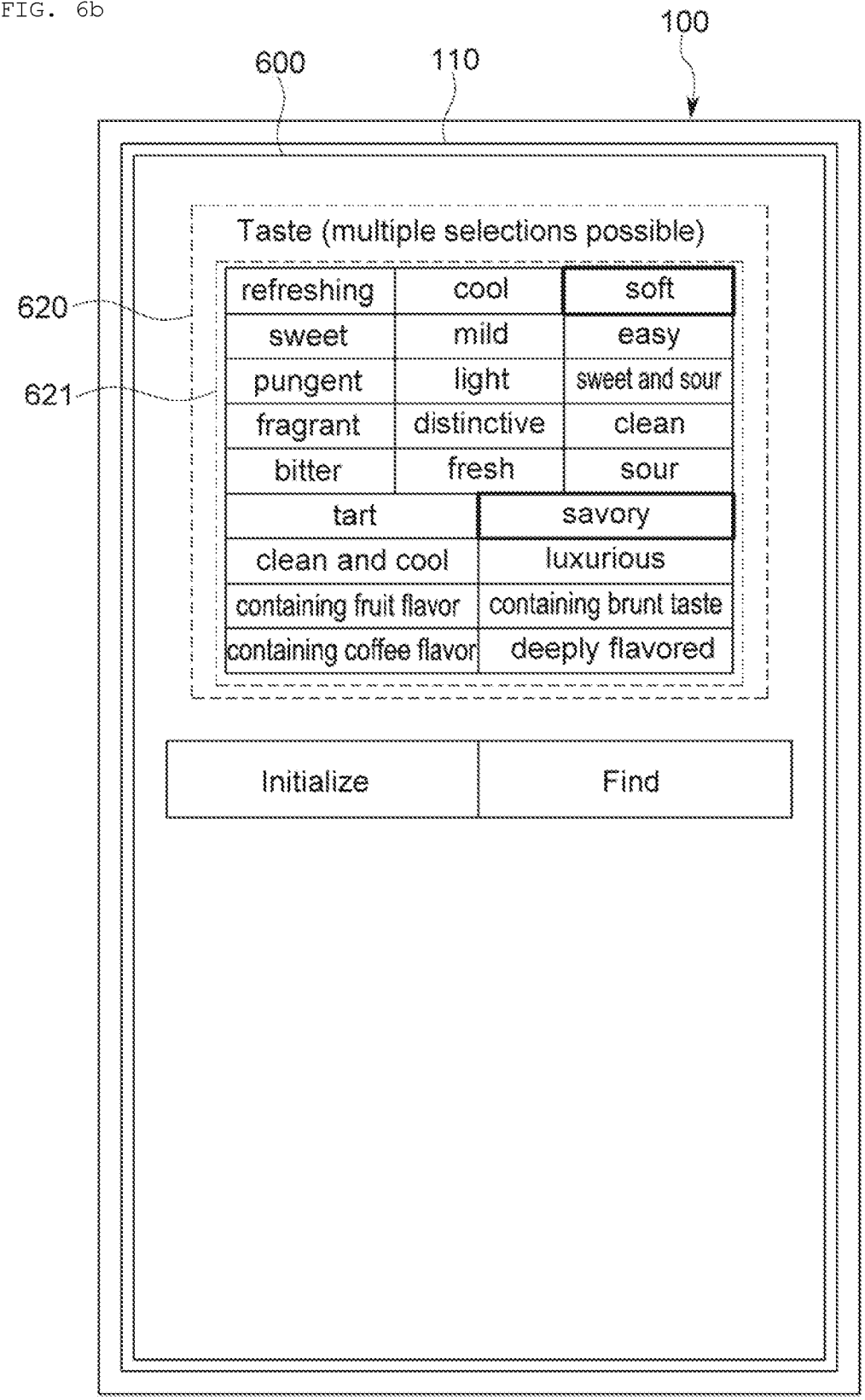

FIG. 6 shows another exemplary embodiment of the designated search field-of-interest attribute selection screen which is provided in the field-of-interest based preference search guidance system according to the present disclosure. More specifically, this drawing shows a designated search field-of-interest attribute selection screen 600 which is provided to a search requester when the search requester selects beer form among fields of interest.

The fixed attributes 611a, 611b, 611c and 611d of a fixed attribute list part 610 related to beer include the type, manufacture country, alcoholic proof and price range of beer, and the variable attributes 621 of a variable attribute list part 620 related to beer include phrases descriptive of the tastes of beer, such as "refreshing," "cool," "soft," etc.

Figure 7A:
FIG. 7 shows another exemplary embodiment of a field-based search requester preference incorporating search keyword guidance screen which is provided in the field-of-interest based preference search guidance system according to the present disclosure.
Figure 7B:
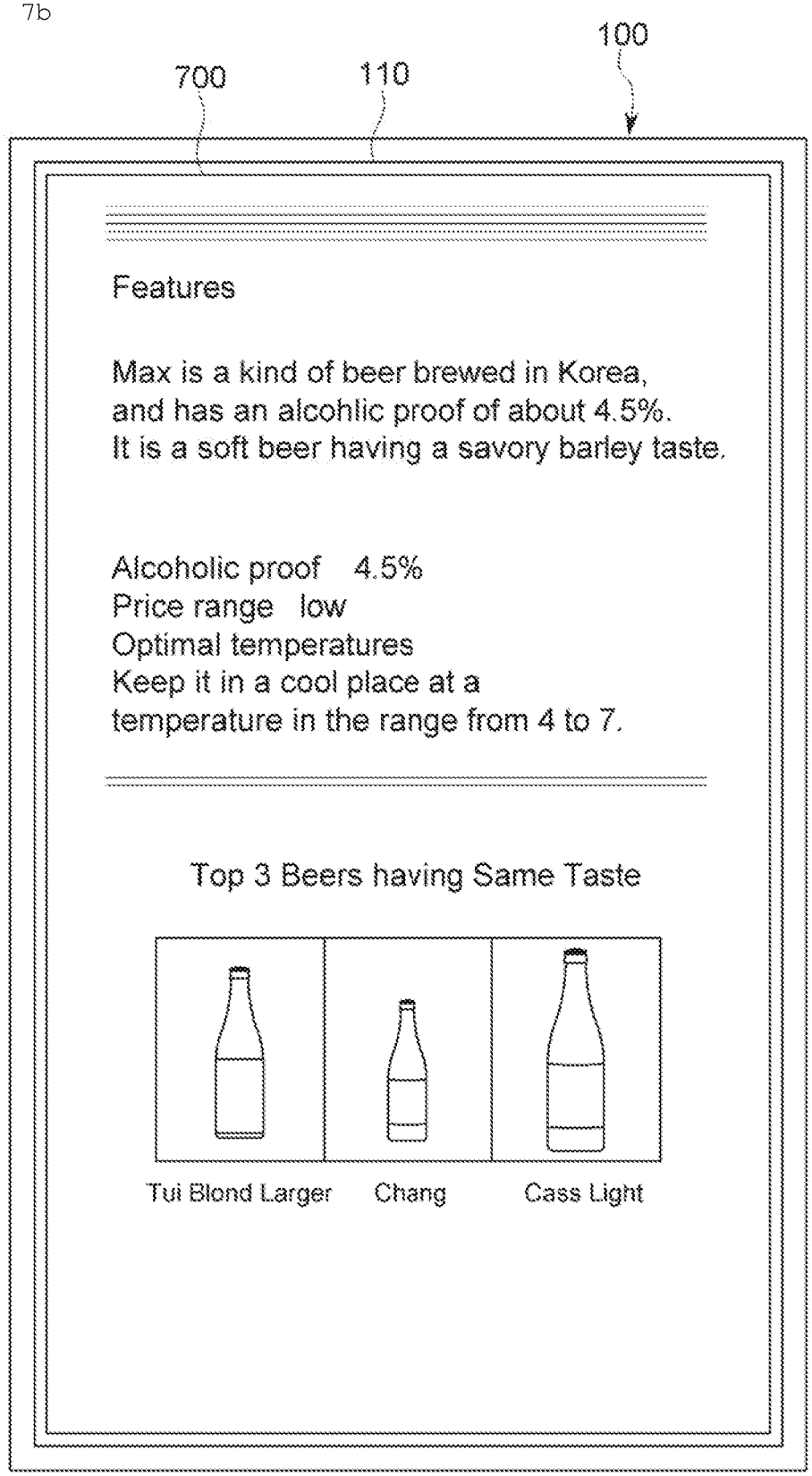

Moreover, FIG. 7 shows another exemplary embodiment of the field-based search requester preference incorporating search keyword guidance screen which is provided in the field-of-interest based preference search guidance system according to the present disclosure. More specifically, this drawing shows a field-based search requester preference incorporating search keyword guidance screen 700 in which rankings are indicated for beer searched for based on information selected by a search requester from among the fixed attributes 611a, 611b, 611c and 611d and variable attributes 621 of the designated search field-of-interest attribute selection screen 600. The search requester can easily search for beer suitable for his or her preference.

DESCRIPTION OF REFERENCE SYMBOLS

100: search requester terminal
110: display part
200: search service provision server
210: DB unit
211: form information DB
212: field-of-interest based keyword fixed attribute list DB
213: field-of-interest based keyword variable attribute list DB
214: customer information DB.
220: keyword management engine
300: search field-of-interest selection screen
400, 600: designated search field-of-interest attribute selection screen
410, 610: fixed attribute list part
420, 620: variable attribute list part 430: designated variable attribute weight part
411a, 411b, 411c, 411d, 411e, 411f, 611a, 611b, 611c, 611d: fixed attribute
421, 621: variable attribute
500, 700: field-based search requester preference incorporating search keyword guidance screen

The invention claimed is:

1. A field-of-interest based preference search guidance system comprising:
a search requester terminal configured to select a desired search field of interest from among provided fields of interest, and to transmit designated attribute information, including designated values of fixed attributes and designated values of variable attributes designated by a search requester in a fixed attribute list part and a variable attribute list part descriptive of field-of-interest based keywords, so that a field-based search requester preference incorporating search keyword suitable for a preference of the search requester is selected from among field-of-interest based keywords belonging to the selected search field of interest; and
a search service provision server configured to provide the fields of interest to the search requester terminal, to provide the fixed attribute list part and the variable attribute list part descriptive of the field-of-interest based keywords belonging to the selected search field of interest to the search requester terminal when the search field of interest is selected from among the provided fields of interest by the search requester terminal, to select field-of-interest based keywords belonging to a fixed attribute designated value from information included in transmitted designated attribute information when the designated attribute information is transmitted from the search requester terminal, to sum points of variable attribute designated values, included in the designated attribute information, among variable attribute values of the selected field-of-interest based keywords, and to transmit the selected field-based search requester preference incorporating search keywords to the search requester terminal with the selected field-based search requester preference incorporating search keywords indicated according to priority;
wherein the fixed attributes are information corresponding to invariable values in information descriptive of the field-of-interest based keywords belonging to the search field of interest; and
wherein the variable attributes are phrases descriptive of the field-of-interest based keywords in occurred events when the events of the corresponding field-of-interest based keywords have occurred in mass media, wherein the mass media comprises TV, newspapers and magazines, search portal sites comprising real-time searches, blogs and Internet cafes, and SNS (Social Network Service), in information descriptive of the field-of-interest based keywords belonging to the field of interest.

2. The field-of-interest based preference search guidance system of claim 1, wherein:
the fixed attribute list part is a list including values of the fixed attributes, which are information corresponding to invariable values in information descriptive of the field-of-interest based keywords belonging to the search field of interest;
the variable attribute list part is a list including the variable attributes, which are phrases descriptive of the field-of-interest based keywords in occurred events when the events of the corresponding field-of-interest based keywords have occurred in the mass media in information descriptive of the field-of-interest based keywords belonging to the field of interest so that the search requester becomes aware of the field-of-interest based keywords; and
a point, indicative of a frequency at which information has been posted to the mass media where the events have occurred, is recorded in conjunction with each of the variable attributes.

3. The field-of-interest based preference search guidance system of claim 1, wherein:
the search service provision server includes a database (DB) unit, and a keyword management engine;
the DB unit includes:
a form information DB configured such that there are stored various types of screens necessary to provide a search keyword incorporating his or her personal preference to the search requester without requiring that the search requester directly designates a search keyword;
a field-of-interest based keyword fixed attribute list DB configured such that information classified and stored for each field of interest, which is values of fixed attributes, which are information corresponding to invariable values among field-of-interest based keywords belonging to the corresponding field of interest and information descriptive of the field-of-interest based keywords, is classified, stored, and managed in a list form;
a field-of-interest based keyword variable attribute list DB configured such that information associated with the field-of-interest based keyword fixed attribute list DB; and
a customer information DB configured such that an ID and password of the search requester are stored.

4. The field-of-interest based preference search guidance system of claim 3, wherein the keyword management engine performs control so that when a value of a variable attribute corresponding to a phrase descriptive of the corresponding field-of-interest based keyword in the posted event is a new value which has not been stored in the field-of-interest based keyword variable attribute list DB, the new value of the variable attribute is additionally stored in the field-of-interest based keyword variable attribute list DB.

5. The field-of-interest based preference search guidance system of claim 3, wherein the form information DB includes a designated search field-of-interest attribute selection screen, including the fixed attribute list part configured such that values of fixed attributes, which are information corresponding to invariable values in information descriptive of the field-of-interest based keywords belonging to the search field of interest are displayed to be selectable, and the variable attribute list part configured such that variable attributes, descriptive of the field-of-interest based keywords belonging to the field of interest, are displayed to be selectable.

6. The field-of-interest based preference search guidance system of claim 5, wherein:
the designated search field-of-interest attribute selection screen includes a designated variable attribute weight part configured to selectively increase and decrease a weight level of a variable attribute designated by the search requester in the variable attributes displayed on the variable attribute list part;
the search requester terminal includes designated variable attribute weight information, generated by a manipulation of the designated variable attribute weight part, in the designated attribute information, and transmits the resulting designated attribute information; and the search service provision server calculates a point of the corresponding variable attribute by incorporating the designated variable attribute weight information into a point of a variable attribute designated value, included in the designated attribute information transmitted from the search requester terminal, through operation of the keyword management engine.

7. The field-of-interest based preference search guidance system of claim 3, wherein the search service provision server, after transmitting the field-based search requester preference incorporating search keyword to the search requester terminal, classifies the designated attribute information, transmitted from the search requester terminal, as user behavior information for the search field of interest of the corresponding search requester, cumulatively stores the user behavior information in the customer information DB, and operates the keyword management engine so that machine learning is performed using the user behavior information cumulatively stored in the customer information DB.

* * * * *